US012602216B2

(12) United States Patent
Batista

(10) Patent No.: US 12,602,216 B2
(45) Date of Patent: Apr. 14, 2026

(54) SCHEMA REGISTRY FOR CLIENT-SERVER ENVIRONMENTS

(71) Applicant: Salesforce, Inc., San Francisco, CA (US)

(72) Inventor: Samuel Batista, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 258 days.

(21) Appl. No.: 18/584,793

(22) Filed: Feb. 22, 2024

(65) Prior Publication Data

US 2025/0272075 A1 Aug. 28, 2025

(51) Int. Cl.

| | |
|---|---|
| ***G06F 8/30*** | (2018.01) |
| ***G06F 8/51*** | (2018.01) |
| ***G06F 8/76*** | (2018.01) |
| ***G06F 16/25*** | (2019.01) |

(52) U.S. Cl.
CPC .................. *G06F 8/51* (2013.01); *G06F 8/76* (2013.01); *G06F 16/252* (2019.01)

(58) Field of Classification Search
CPC .......................................................... G06F 8/30
See application file for complete search history.

(56) References Cited

U.S. PATENT DOCUMENTS 11,785,280 B1 * 10/2023 Dakss .............. H04N 21/43079 725/37
2011/0314043 A1 * 12/2011 Bernstein ................ G06F 16/84 707/769
2023/0095852 A1 * 3/2023 Paez ................... H04L 67/1087 717/170
2023/0098725 A1 * 3/2023 Tidd ...................... H02J 7/0047 717/106

* cited by examiner

*Primary Examiner* — Jae U Jeon
(74) *Attorney, Agent, or Firm* — Kwan & Olynick LLP

(57) ABSTRACT

In some embodiments, a method receives a schema registry in a file. The schema registry aggregates schema files for a data model that is associated with a database system used by servers and consumer devices. The schema files is in a first software language that describes objects in the data model, and the schema registry is in a second software language used by the consumer devices. A first function in the schema registry is executed for an object to retrieve an original schema for the object in the schema files to create first software code for the object with the original schema for an application that uses the data model. A second function in the schema registry is executed for the object to generate a new object from the original schema for the object to create second software code for a new object with the original schema for the application.

13 Claims, 13 Drawing Sheets

┌─200

Schema Registry Generation Method

Retrieve schema files for an application ─202

Aggregate schema files into a single file ─204

Apply a register schema function to find objects and create definitions for the objects ─206

Generate variables containing the definitions ─208

Insert the variables in a schema registry for upload to consumer devices ─210

Generate a validation file for the objects ─212

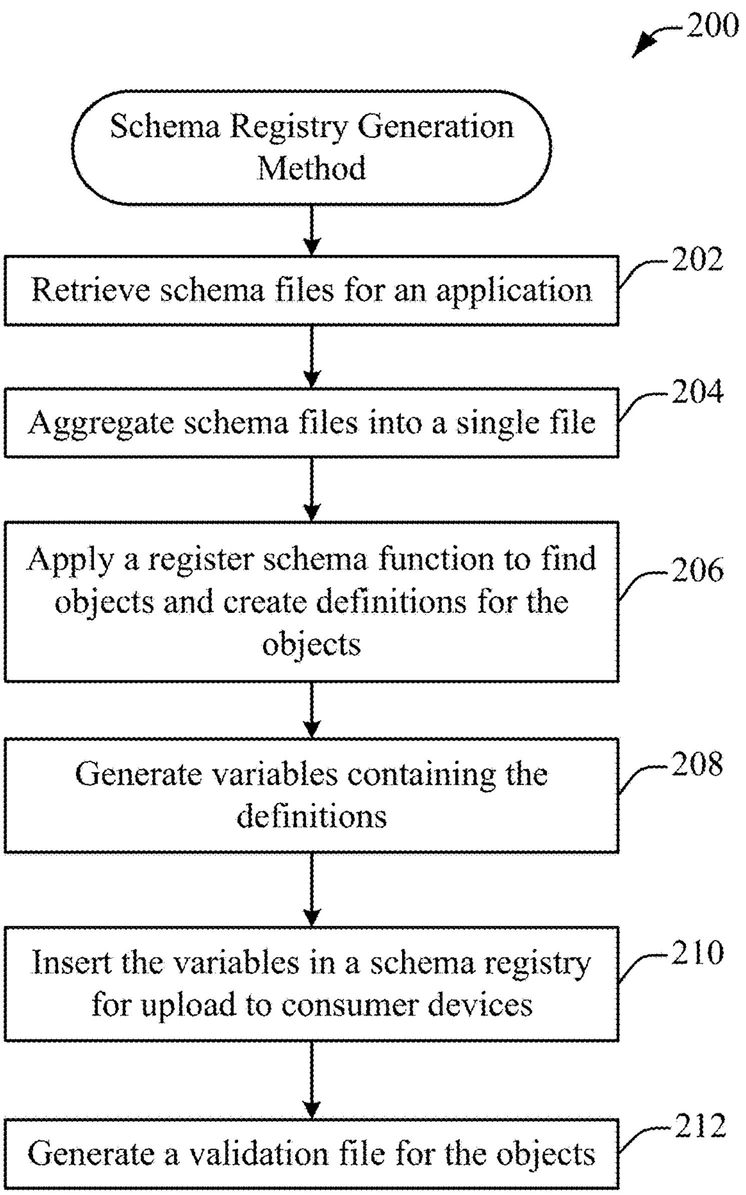

Figure 4:
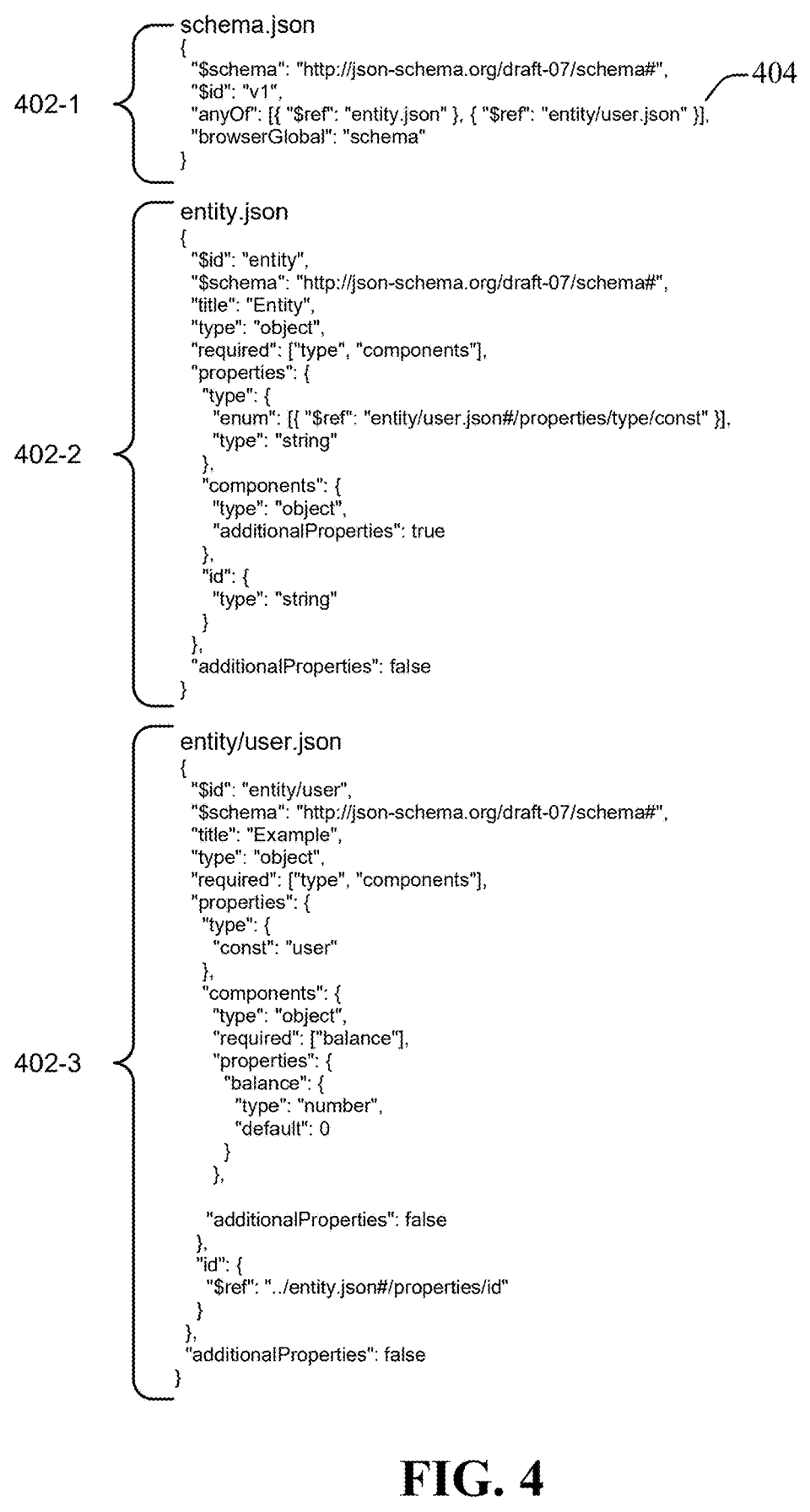

```
schema.json
{
 "$schema": "http://json-schema.org/draft-07/schema#",
 "$id": "v1",
 "anyOf": [{ "$ref": "entity.json" }, { "$ref": "entity/user.json" }],
 "browserGlobal": "schema"
}
```

402-2

```
entity.json
{
 "$id": "entity",
 "$schema": "http://json-schema.org/draft-07/schema#",
 "title": "Entity",
 "type": "object",
 "required": ["type", "components"],
 "properties": {
  "type": {
   "enum": [{ "$ref": "entity/user.json#/properties/type/const" }],
   "type": "string"
  },
  "components": {
   "type": "object",
   "additionalProperties": true
  },
  "id": {
   "type": "string"
  }
 },
 "additionalProperties": false
}
```

402-3

```
entity/user.json
{
 "$id": "entity/user",
 "$schema": "http://json-schema.org/draft-07/schema#",
 "title": "Example",
 "type": "object",
 "required": ["type", "components"],
 "properties": {
  "type": {
   "const": "user"
  },
  "components": {
   "type": "object",
   "required": ["balance"],
   "properties": {
    "balance": {
     "type": "number",
     "default": 0
    }
   },

  "additionalProperties": false
 },
 "id": {
  "$ref": "../entity.json#/properties/id"
 }
},
"additionalProperties": false
}
```

FIG. 4 schema.registry.js

```
const schema = {
  get: () => ({
    $schema: 'http://json-schema.org/draft-07/schema#',
    $id: 'v1',
    anyOf: [entity.get(), entity_user.get()],
    browserGlobal: 'schema'
  })
};
```

502-1

```
const entity_user = {
  get: () => ({          ——504-1
    $id: 'entity/user',
    $schema: 'http://json-schema.org/draft-07/schema#',
    title: 'User',
    type: 'object',
    required: ['type', 'components'],
    properties: {
      type: { const: 'user' },
      components: {
        type: 'object',
        required: ['balance'],
        properties: { balance: { type: 'number', default: 0, minimum: 0 } },
        additionalProperties: false
      },
      id: { type: 'string' }
    },
    additionalProperties: false                    506-1
  }),
  new: (/** @type {unknown} */ override) => {
    const original = /** @type {const} */ ({ type: 'user', components: { balance: 0 } });
    return /** @type {typeof original} */ (override != null ? merge(original, override) : original || {});
  }
};
```

502-2

```
const entity = {
  get: () => ({          ——504-2
    $id: 'entity',
    $schema: 'http://json-schema.org/draft-07/schema#',
    title: 'Entity',
    type: 'object',
    required: ['type', 'components'],
    properties: {
      type: { enum: ['user'], type: 'string' },
      components: { type: 'object', additionalProperties: true },
      id: { type: 'string' }
    },
    additionalProperties: false                    506-2
  }),
  new: (/** @type {unknown} */ override) => {
    const original = /** @type {const} */ ({ type: 'user', components: {} });
    return /** @type {typeof original} */ (override != null ? merge(original, override) : original || {});
  }
};
```

```
schema.types.ts
□/* eslint-disable */
export type V1 = Entity | User;
export interface Entity {
  type: 'user';
  components: {          604-1
    [k: string]: any;
  };
  id?: string;
}
export interface User {
  type: 'user';
  components: {          604-2
    balance: number;
  };
  id?: string;
}
```

Schema Registry Access Method

Receive request for a data model via an API from a consumer device ⌐702

Retrieve schema registry ⌐704

Retrieve validation file for the schema registry ⌐706

Send schema registry and validation file to the consumer device ⌐708

┌─── 800

Schema Registry Use Method

Receive the schema registry and the validation file          ─ 802

Generate code using the get function to retrieve a schema definition for an object or the new function to create a schema definition for an object          ─ 804

Validate the code using the validation file          ─ 806

Output any errors found in the code          ─ 808

Store the code after any corrections of errors          ─ 810

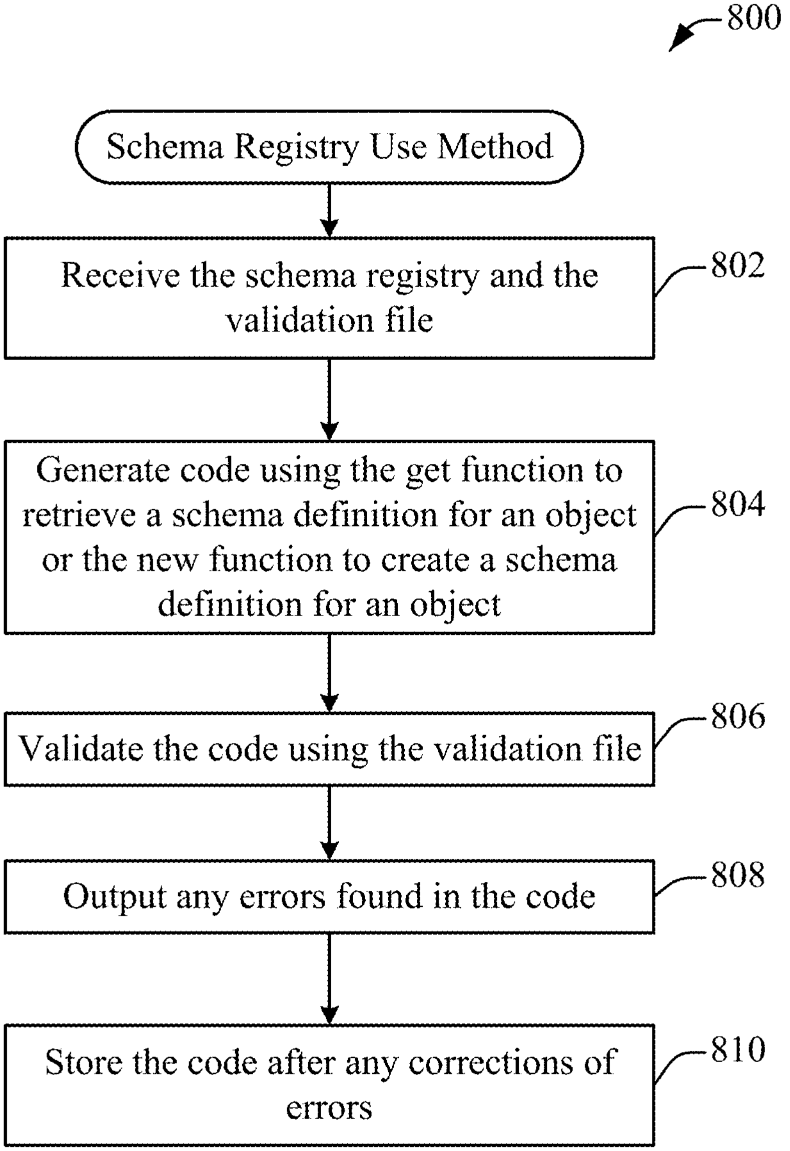

```
(async () => {
  const example_schema = {
  $id: 'entity/user',
  $schema: 'http://json-schema.org/draft-07/schema#',
  title: 'User',
  type: 'object',
  required: ['type', 'components'],
  properties: {
    type: { const: 'user' },
    components: {
      type: 'object',
      required: ['balance'],
      properties: { balance: { type: 'number', default: 0 } },
      additionalProperties: false
    },
    id: { type: 'string' }
  },
  additionalProperties: false
 };
 const example_data = {
  type: 'user', components: { balance: null }
 };
```

902-2

```
 // Load ajv7 JSON Schema validation library
 const ajv7 = await fetch('https://cdnjs.cloudflare.com/ajax/libs/ajv/8.12.0/ajv7.min.js')
    .then(response => response.text());
 const ajv7Module = new module.constructor('ajv7.min.js', module.parent);
 ajv7Module._compile(ajv7, 'ajv7.min.js');
 const Ajv = ajv7Module.exports.default;

 // Create validation function using example entity/user schema
 const validate = new Ajv().compile(example_schema);

 // Call the validation function using example data and print the results
 const valid = validate(example_data);
 const result = { valid, errors: validate.errors };
 console.log(JSON.stringify(result, undefined, 2));
})()
```

FIG. 9

SCHEMA REGISTRY FOR CLIENT-SERVER ENVIRONMENTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to databases and more specifically to client-server applications.

BACKGROUND

A full stack application may run on one or more servers and one or more consumer devices, where the consumer devices may access a database via the servers. A developer may define data models that the server will be compatible with and operate on to access data in the database. The data model may be a representation of how the data is stored in the database and is needed to properly access data in the database. In a full stack application, the data models need to operate and be validated on both the server and the client. This requirement, however, poses challenges in how to share the data model definitions between the server and client, and also how to validate that developers working on the data models are using the data models correctly.

BRIEF DESCRIPTION OF THE DRAWINGS

The included drawings are for illustrative purposes and serve only to provide examples of possible structures and operations for the disclosed inventive systems, apparatus, methods and computer program products for client-server applications in databases. These drawings in no way limit any changes in form and detail that may be made by one skilled in the art without departing from the spirit and scope of the disclosed implementations.

FIG. 2 depicts a simplified flowchart of generating the schema registry according to some embodiments.

FIG. 4 depicts an example of schema registry files that are aggregated into a single object according to some embodiments.

FIG. 5 shows an example of a schema registry according to some embodiments.

FIG. 6 depicts an example of a validation file to some embodiments.

FIG. 8 depicts a simplified flowchart of a method for using the schema registry to develop software code according to some embodiments.

FIG. 9 depicts an example of code that a consumer device may generate according to some embodiments.

DETAILED DESCRIPTION

System Overview

Figure 1:
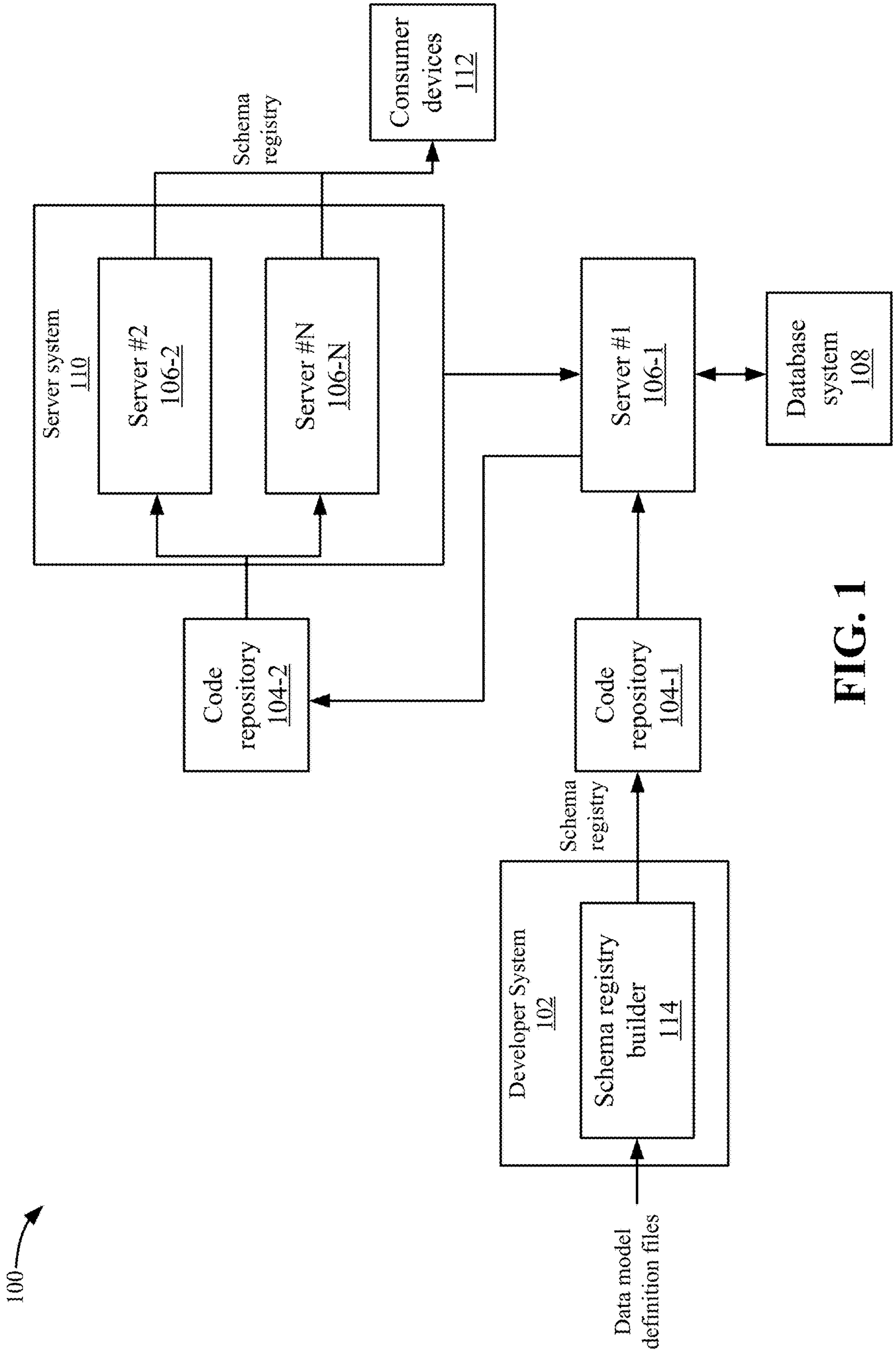
FIG. 1 depicts a simplified system for using a data model according to some embodiments.

A schema registry may be used to develop an application that includes both a frontend and a backend, such as consumer side components in the front end and server side components in the backend. The schema registry may be generated by transforming a collection of separate schema files that are associated with data model definitions. The data model definitions may define the structure and relationships of data within a database system that is used for the application. The schema registry may aggregate several data model definitions into a single file (or multiple files that are less than the number of schema files). On the backend, the data model definitions may be written in a language that is used to generate data model definitions, such as JavaScript Object Notation (JSON). A JSON schema may be a set of rules that helps define the format and structure of data in the database system. For example, the schema may define data elements that should be in the data model, and characteristics, such as sizes and data types, and their purposes in the data model. The JSON schema can be translated into various programming languages to provide definitions for the data types. The JSON schema helps developers understand exactly what type of data is stored in the database system, such as numbers, text, dates, etc., and how the types of data should be used in developing a software code for the application. This ensures that the data used in the application is consistent and meets expected standards. In some embodiments, the schema registry may be a single file that is associated with a consumer side programming language, such as JavaScript™.

The servers may expose the schema registry via an interface to consumer devices. Consumer devices can be used by developers to access data model definitions through functions provided through the schema registry. This data can then be used to run business logic such as validating user data against data models. One created function may be a get function in JavaScript™ that retrieves the original schema definition for an object. Also, the consumer devices may generate a new object from the schema definitions using another function, such as a new function that is generated for the schema registry in JavaScript™. Additionally, a validation file, such as a TypeScript file, provides validation information that can be used by development tools to provide developers with a better development experience, through features such as auto-complete and type checking (ensuring the user does not assign a numeric value to a variable that is supposed to hold text data for example). The validation information may be determined based on the data model definitions in the schema registry.

In some examples, multiple developers may want to develop the application to use data stored in the database system. There may be problems if the developers are not using the same version of the data model or not adhering to the requirements defined by the data model. The schema registry allows consumer devices to use the correct version of data model definitions, and validates any changes to the data model using the validation file. For example, any changes to the data model may result in errors at compile time, such as accessing a field that was removed or renamed in the data model may be detected by the validation file and an error is returned at compile time of the application. This improves the development of the application because errors may be detected earlier.

System

FIG. 1 depicts a simplified system 100 for using a data model according to some embodiments. System 100 includes a developer system 102, servers 106-1 to 106-N, database system 108, and consumer devices 112. System 100 may include servers that form a backend side of the full stack application. For example, a server #1 106-1 may be used to access database system 108. Also, servers #2 106-2 to server #N 106-N, where N is an integer, may be used to interact with a frontend, which is the consumer side that includes one or more consumer devices 112. Server #2 106-2 to server #N 106-N may form a server system 110 that may serve files to consumer devices 112 from database system 108. When server system 110 is referred to, any of server #2 106-2 to 106-N may be used. Also, server #1 106-1 may be the server that interacts with database system 108. Server system 110 may send requests for files to server #1 106-1, server #1 106-1 retrieves the files, and returns the files to server system 110. Then, server system 110 interacts with consumer devices 112 to send the files to consumer devices 112. Although this structure of the backend and the frontend are described, other structures may be appreciated.

Developer system 102 may be used to generate a schema registry. For example, a schema registry builder 114 may receive data model definition files and generate the schema registry. The data model definition files may be multiple files that include definitions for data models stored in a database system. As discussed above, the data model schema definitions may describe the structure and relationships of how data is stored in database system 108 for an application, and be in a common data format, such as JSON. The schema registry may aggregate one or more data models in a single file in a client side language, such as a JavaScript™ file. Schema registry builder 114 may store the schema registry in a code repository 104-1.

Server #1 106-1 may distribute the schema registry to one or more code repositories 104-2 that are accessed by server #2 106-2 to 106-N. This may ensure that the version that is being used by servers 106 is the same. Then, server #2 106-2 to 106-N can provide the schema registry to consumer devices 112 via an interface. Consumer devices 112 may be used by developers to write software code for the application using the schema registry. Once the application is finished, consumer devices 112 may be used to access the application.

The use of the schema registry provides many advantages. For example, the schema registry can be provided between server #2 106-2 to 106-N and consumer devices 112 in a single file via an interface. The single file may be in a consumer side language as described above. In some embodiments, a single JavaScript™ file can be loaded directly into JavaScript™ runtime environments running on consumer devices 112. The schema registry that is being operated on by consumer devices 112 may ensure that the same data model definitions are being used by multiple consumer devices 112. Also, as will be described below, functions, such as a get function and a new function, may be generated to expose the data model objects in the schema registry to consumer devices 112. Further, a validation file may provide validation of the data models that are generated by consumer devices 112. Usage of the schema registry ensures there is a single source of truth for the data model definitions. This results in fewer errors due to outdated code, and creates higher productivity by eliminating the need to manually synchronize the data model definitions.

The following will describe the generation of the schema registry and then the use of the schema registry according to some embodiments.

Schema Registry

FIG. 2 depicts a simplified flowchart 200 of generating the schema registry according to some embodiments. At 202, schema registry builder 114 retrieves schema files for an application. For example, for a specific full stack application, schema registry builder 114 may determine the schema files that have been generated for the data model associated with the application. The schema files may be in a server side language, such as JSON, but other types of languages may be appreciated. For example, the schema files may be JSON schema files that define schema definitions for data objects using the JSON language.

At 204, schema registry builder 114 aggregates the schema files into a single file. For example, the single file may be a JSON object. An example of the file is described in FIG. 4.

At 206, schema registry builder 114 applies a register schema function to find objects and create definitions for the objects. The register schema function may process the objects and generate definitions for the objects using a new function and the get function. The register schema function will be described in more detail in FIG. 3.

At 208, schema registry builder 114 generates variable definitions containing the definitions that are created at 208. The variables may be JavaScript™ variables that are containers that hold the schema definitions. Variables are identifiers that allow developers to specify which parts of the registry they want to access. Developers can then use that identifier to get access to 'get' and 'new' functions that contain the data model definitions.

At 210, schema registry builder 114 inserts the variables in a schema registry for upload to consumer devices 112. In some embodiments, the variable definitions may be exported into a JavaScript Universal Module template. The JavaScript Universal Module template may be run on both the consumer devices 112 and servers 106. The Universal Module template may then be loaded on consumer devices 112, such as in a JavaScript runtime environment including a Node.js and web browser environment. Node.js may be a runtime environment that allows consumer devices 112 to execute JavaScript™ code outside of a web browser. Also, the web browser environment may allow the execution of JavaScript™ code in the web browser. A developer may then generate software code using the schema registry.

At 212, schema registry builder 114 generates a validation file for the objects. In some embodiments, the validation file may define types for the schema definitions that allow errors to be caught at compile time. The validation file may define the types, which may be structure definitions for different variables, functions, objects and other structures in the data model. For example, a variable may be defined as a string, number, Boolean, etc. In some embodiments, the validation file may include TypeScript types, but other languages may be used.

The following will now describe the register schema function execution in more detail.

Register Schema Function

Figure 3:
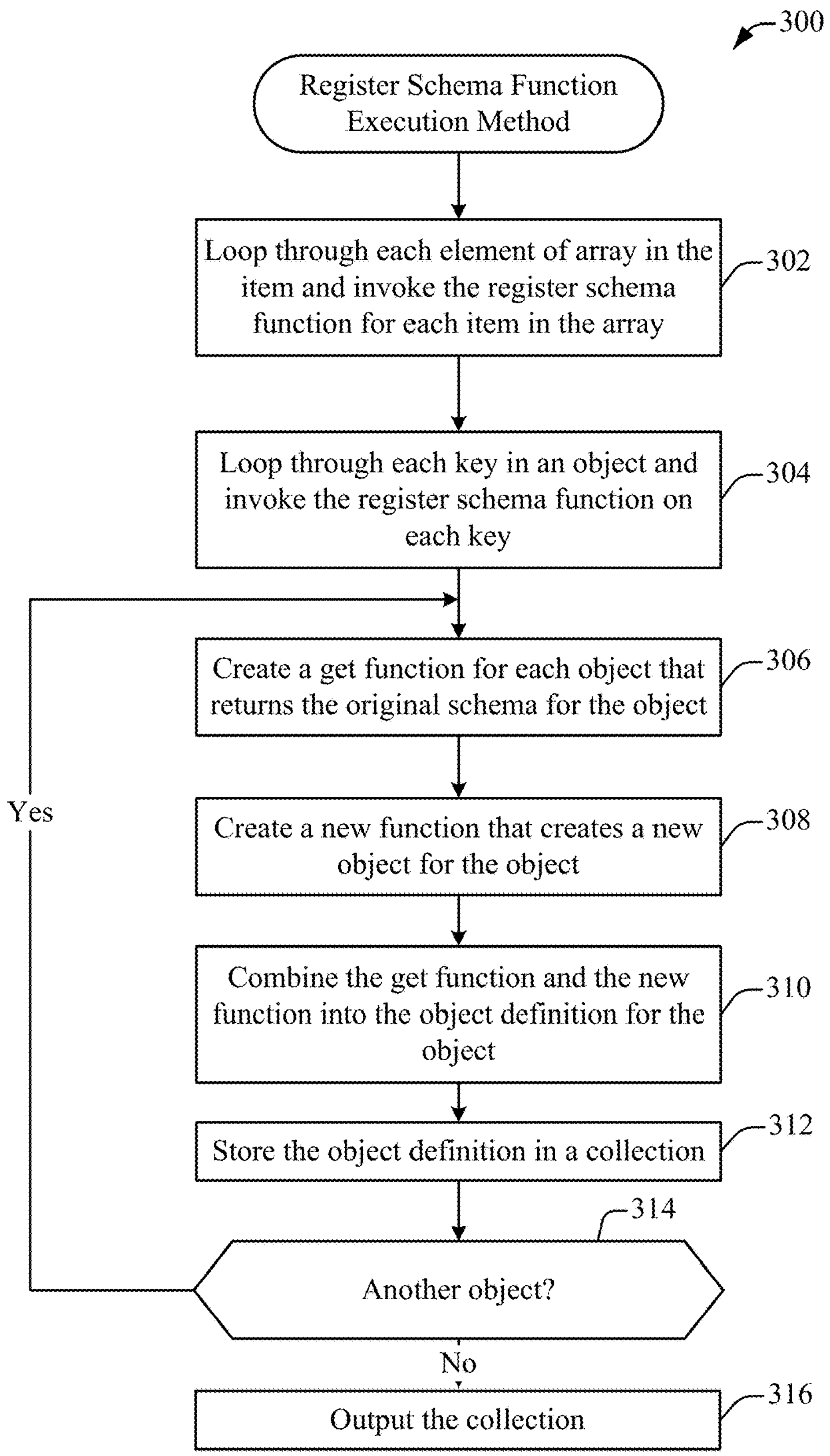
FIG. 3 depicts a simplified flowchart of a method for executing the register schema function according to some embodiments.

FIG. 3 depicts a simplified flowchart 300 of a method for executing the register schema function according to some embodiments. As described above at 208 in FIG. 2, the register schema function is executed to find objects. Although the following process is described, other processes may be used to determine objects and generate definitions for the objects. The register schema function may be a recursive function. This may start with the root schema object in the single file and iterate through items by calling the function on the items. Different types of items may be included in the schema object, such as arrays and objects. The following describes processing of arrays and objects, but other items may be processed. The array may include multiple elements that may be considered objects. If the schema item is an array, the following may be performed. At 302, schema registry builder 114 loops through each element of an array and invokes the register schema function for each item in the array. An array in JSON may be an object that has one or more items. The register schema function may be executed on each item in the array. When objects are found in the array, the register schema function registers the object. By registering the object, the register schema function will then generate a definition for the object.

Also, schema registry builder 114 may process objects. If the schema item is an object, the following may be performed. The register schema function registers the object. There may be other objects embedded in the object. The register schema function may traverse the keys of the object to determine any other objects. At 304, schema registry builder 114 loops through each key in an object and invokes the register schema function on each key. A key in a JSON object may be an identifier associated with a specific value in the object. The register schema function may be executed on each key in the object. When objects are found in the object, the register schema function registers the object. By registering the object, the register schema function will then generate a definition for the object.

For each object that is found above in 302 and 304, the following may be performed. The register schema transforms data model definitions (in JSON) into JavaScript that can be consumed by JavaScript runtimes and then stores this transformed code in a collection that at the end will be used to build the final output. At 306, schema registry builder 114 creates a get function for an object that returns the original schema for the object. For example, the JSON schema that was originally defined in the schema definition file for the object may be returned using the get function. The get function may be a JavaScript function that is designed to retrieve and return values, such as the original schema for the object.

At 308, schema registry builder 114 creates a new function that creates a new Javascript object that conforms to the data model definition. The new function in JavaScript may create an instance of an object that conforms to the schema definition for the object.

At 310, schema registry builder 114 combines the get function and the new function into an object definition for the object.

At 312, schema registry builder 114 stores the object definition in a collection. At 314, schema registry builder 114 determines if another object in the single file needs to be processed. If so, the process reiterates the 302 to process the next object. If not, at 316, the schema registry builder 114 outputs the collection, and the collection is processed as described at 210 above to generate variables in the schema registry.

FIG. 4 depicts an example of schema registry files that are aggregated into a single object according to some embodiments. At 402-1 to 402-3, items for three schema registry files are shown. The three items for the schema registry files may be labeled as "schema.JSON", "entity.JSON", and "entity/user.JSON". The register schema function may search through the items in the software code looking for objects to register. For example, item 402-1 may define characteristics of the data model, such as the file location, version (e.g., v1), etc. Item 402-1 may also include an array of "anyOf" at 404. The register schema function iterates through the elements of the array to register the objects of "entity.json" and "entity/user.json". Items 402-2 and 402-3 may include definitions for objects in the data model. The objects in the items 402 may include schema definitions, including keys for the title, type, properties, components, etc. The values for the keys may include definitions for the data model. The register schema function can also iterate through the keys of items 402-2 and 402-3 looking for more objects to register. In this case, more objects are not found, but could be defined as keys in the items.

FIG. 5 shows an example of a schema registry according to some embodiments. The objects from the schema registry files may be stored as one object in a single file. The schema registry includes variables for the objects in FIG. 4 at 502-1 and 502-2. The variable definition for the object at 402-1 is shown at 502-2 and the variable definition for the object at 402-2 is shown at 502-1 in the schema registry. The variable may be a "const" variable in JavaScript™.

The schema definition for respective objects is included in the variable definition. For example, the get function and the new function are included in the variable definition. For the variable definition at 502-1, a get function is defined at 504-1 to return the JSON schema as it was originally defined in the associated schema file at 402-2. Also, at 506-1, a new function is defined to create a new object that conforms to the schema definition for this object. For the variable definition at 502-2, a similar get function is shown at 504-2 to return the original schema for the item at 402-1. Also, at 506-2, a new function is provided to create a new object that conforms to the schema for this variable definition. The get function may include information for the schema definition, including the title, type, properties, components, etc., and associated values from the schema files. The new function may generate a new object using the information from the schema definition that is defined in the get function. The format of both functions may be in the consumer side language of JavaScript™. Other information may be included in the schema registry, such as software code to enable this JavaScript module to be universal (meaning it can be used in browsers as well as Node.js).

FIG. 6 depicts an example of a validation file 602 according to some embodiments. Validation file 602 may define validation information that exposes the original JSON schema data model definitions, which can be used with various validation libraries that are compatible with JSON schema. The typescript file provides type definitions, which are used by developers during development to ensure they are accessing and manipulating data correctly. The registry enables validation during development and also during the runtime of the application. For example, development time validation (validation done by development tools), and runtime validation (validation done against user data on consumer devices) can use validation file 602. The validation information enables compile time validation by providing the TypeScript type definitions, and runtime validation by providing the original JSON schema data in JavaScript, which then can be used by any number of validation libraries to validate aspects of the data model generated at consumer devices 112. The validation information contains interfaces that can be attached to variables at development time. Development tools are then able to provide development assistance such as code completion and compile time validation to enable developers to work faster and safer with schema compatible data. For example, validation file 602 may define properties of the objects, such as the object of "user" should be a string as shown at 604-1 and field of balance should be a number as shown at 604-2. Validation file 602 may also include other validation information.

Validation file 602 may be TypeScript, which is an enhanced version of JavaScript™, that adds stricter rules for organizing software code and helps prevent errors. The TypeScript file is converted into JavaScript™ during the build process before being used by consumer devices 112.

The types in FIG. 6 can be used by programmers when they are defining variables, which allows developers to catch mistakes early in the development process before code is deployed to production, such as at compile time of any code written at consumer devices 112. Developers can run validations by passing the data model definitions from the schema registry (by calling the get function), along with the user data, to a schema validation library that ensures the user data is compatible with the data model definitions.

After generating that schema registry, consumer devices 112 may use the schema registry to develop software code for applications that interact with data that conforms to data models stored inside the schema registry.

Schema Registry Use

Figure 7:
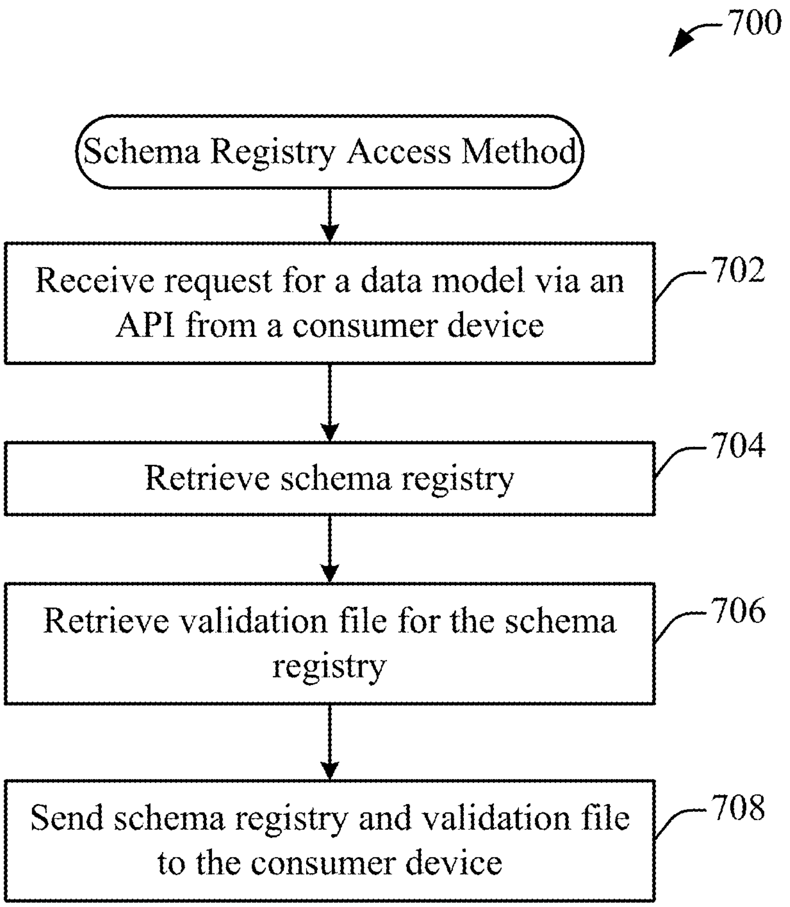
FIG. 7 depicts a simplified flowchart of a method for accessing the schema registry according to some embodiments.
Figure 10:
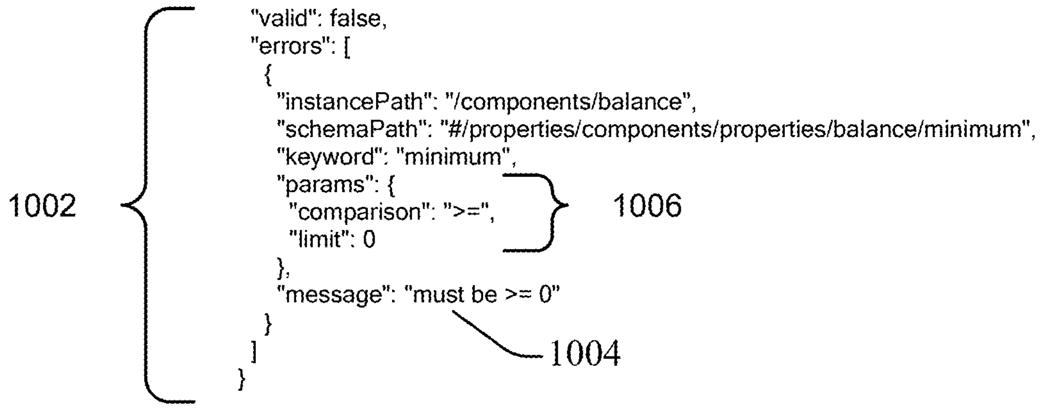
FIG. 10 depicts an example of the output after compiling of the code according to some embodiments.

FIG. 7 depicts a simplified flowchart 700 of a method for accessing the schema registry according to some embodiments. At 702, server system 110 receives a request for a data model via an application programming interface (API) from a consumer device 112. At 704, the schema registry is retrieved. For example, server system 110 may retrieve the schema registry from code repository 104-2. As described above, the schema registry was stored in code repository 104-2 by server #1 106-1. At 706, server system 110 retrieves the validation file for the schema registry. Then, at 708, server system 110 sends the schema registry and the validation file to consumer device 112.

Once receiving the schema registry, consumer device 112 may use the schema registry to develop code for the application. FIG. 8 depicts a simplified flowchart 800 of a method for using the schema registry to develop software code according to some embodiments. At 802, consumer device 112 receives the schema registry and the validation file from server system 110.

At 804, consumer device 112 generates code using the get function to retrieve a schema definition for an object or the new function to create a new object with the schema definition. The get function or the new function is provided in the schema registry for different objects. Using the get function or the new function allows consumer device 112 to adhere to the definitions of objects found in the data model.

At 806, consumer device 112 validates the code using the validation file. For example, the code may be validated, and uses the types found in the validation file, such as the TypeScript file, to determine whether the correct types have been used in the code for the objects.

At 808, any errors found in the code is output. A user can correct the code based on the errors. After correcting any errors, at 810, the code may be stored.

CONCLUSION

Accordingly, a schema registry is used to aggregate schema registry files into a single object. Then, that object can be used to generate a schema registry that includes JavaScript variables containing the schema definitions from the schema registry files. The schema registry may be accessed via an interface by consumer devices 112 in a JavaScript runtime environment. Then, consumer devices 112 may use the get function and new function to develop code for the application. The validation file may then be used to validate the code during compile time.

Figure 11:
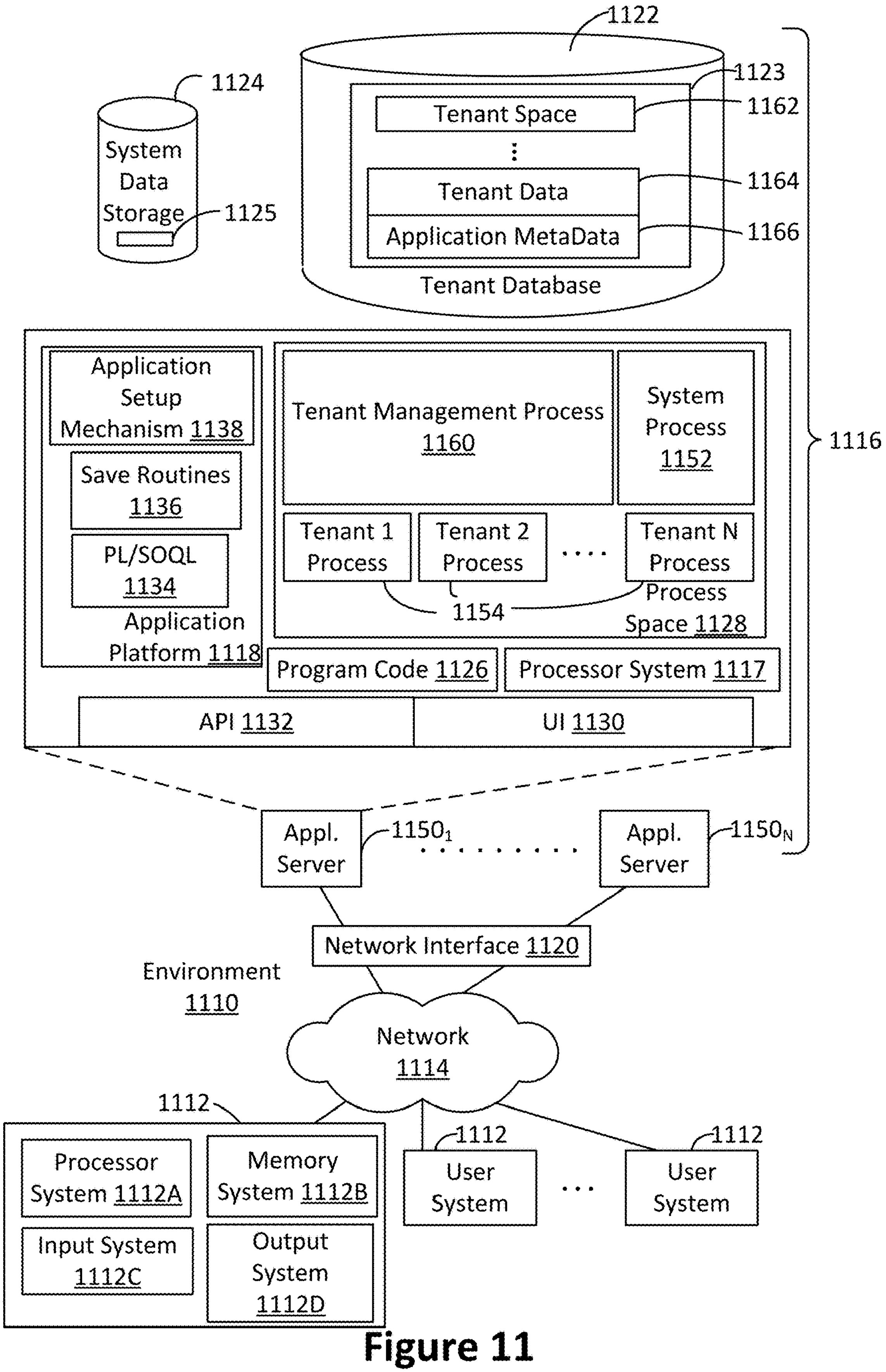
FIG. 11 shows a block diagram of an example of an environment that includes an on-demand database service configured in accordance with some implementations.

FIG. 11 shows a block diagram of an example of an environment 1110 that includes an on-demand database service configured in accordance with some implementations. Environment 1110 may include user systems 1112, network 1114, database system 1116, processor system 1117, application platform 1118, network interface 1120, tenant data storage 1122, tenant data 1123, system data storage 1124, system data 1125, program code 1126, process space 1128, User Interface (UI) 1130, Application Program Interface (API) 1132, PL/SOQL 1134, save routines 1136, application setup mechanism 1138, application servers 1150-1 through 1150-N, system process space 1152, tenant process spaces 1154, tenant management process space 1160, tenant storage space 1162, user storage 1164, and application metadata 1166. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1116, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1118 may be a framework that allows the creation, management, and execution of applications in system 1116. Such applications may be developed by the database service provider or by users or third-party application developers accessing the service. Application platform 1118 includes an application setup mechanism 1138 that supports application developers' creation and management of applications, which may be saved as metadata into tenant data storage 1122 by save routines 1136 for execution by subscribers as one or more tenant process spaces 1154 managed by tenant management process 1160 for example. Invocations to such applications may be coded using PL/SOQL 1134 that provides a programming language style interface extension to API 1132. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1166 for a subscriber making such an invocation. Such system processes may also manage execution of application metadata 1166 as an application in a virtual machine.

In some implementations, each application server 1150 may handle requests for any user associated with any organization. A load balancing function (e.g., an F5 Big-IP load balancer) may distribute requests to the application servers 1150 based on an algorithm such as least-connections, round robin, observed response time, etc. Each application server 1150 may be configured to communicate with tenant data storage 1122 and the tenant data 1123 therein, and system data storage 1124 and the system data 1125 therein to serve requests of user systems 1112. The tenant data 1123 may be divided into individual tenant storage spaces 1162, which can be either a physical arrangement and/or a logical arrangement of data. Within each tenant storage space 1162, user storage 1164 and application metadata 1166 may be similarly allocated for each user. For example, a copy of a user's most recently used (MRU) items might be stored to user storage 1164. Similarly, a copy of MRU items for an entire tenant organization may be stored to tenant storage space 1162. A UI 1130 provides a user interface and an API 1132 provides an application programming interface to system 1116 resident processes to users and/or developers at user systems 1112.

System 1116 may implement a web-based application development system. For example, in some implementations, system 1116 may include application servers configured to implement and execute software applications. The application servers may be configured to provide related data, code, forms, web pages and other information to and from user systems 1112. Additionally, the application servers may be configured to store information to, and retrieve information from a database system. Such information may include related data, objects, and/or Webpage content. With a multi-tenant system, data for multiple tenants may be stored in the same physical database object in tenant data storage 1122, however, tenant data may be arranged in the storage medium(s) of tenant data storage 1122 so that data of one tenant is kept logically separate from that of other tenants. In such a scheme, one tenant may not access another tenant's data, unless such data is expressly shared.

Several elements in the system shown in FIG. 11 include conventional, well-known elements that are explained only briefly here. For example, user system 1112 may include processor system 1112A, memory system 1112B, input system 1112C, and output system 1112D. A user system 1112 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1112 to access, process and view information, pages and applications available from system 1116 over network 1114. Network 1114 may be any network or combination of networks of devices that communicate with one another, such as any one or any combination of a LAN (local area network), WAN (wide area network), wireless network, or other appropriate configuration.

The users of user systems 1112 may differ in their respective capacities, and the capacity of a particular user system 1112 to access information may be determined at least in part by "permissions" of the particular user system 1112. As discussed herein, permissions generally govern access to computing resources such as data objects, components, and other entities of a computing system, such as a server system 110 or data model, a social networking system, and/or a CRM database system. "Permission sets" generally refer to groups of permissions that may be assigned to users of such a computing environment. For instance, the assignments of users and permission sets may be stored in one or more databases of System 1116. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1116 may provide on-demand database service to user systems 1112 using an MTS arrangement. By way of example, one tenant organization may be a company that employs a sales force where each salesperson uses system 1116 to manage their sales process. Thus, a user in such an organization may maintain contact data, leads data, customer follow-up data, performance data, goals and progress data, etc., all applicable to that user's personal sales process (e.g., in tenant data storage 1122). In this arrangement, a user may manage his or her sales efforts and cycles from a variety of devices, since relevant data and applications to interact with (e.g., access, view, modify, report, transmit, calculate, etc.) such data may be maintained and accessed by any user system 1112 having network access.

When implemented in an MTS arrangement, system 1116 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1116 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1116 may also maintain system-level data usable by multiple tenants or other data. Such system-level data may include industry reports, news, postings, and the like that are sharable between tenant organizations.

In some implementations, user systems 1112 may be client systems communicating with application servers 1150 to request and update system-level and tenant-level data from system 1116. By way of example, user systems 1112 may send one or more queries requesting data of a database maintained in tenant data storage 1122 and/or system data storage 1124. An application server 1150 of system 1116 may automatically generate one or more SQL statements (e.g., one or more SQL queries) that are designed to access the requested data. System data storage 1124 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table". In some implementations, tenants may be allowed to create and store custom objects, or they may be allowed to customize standard entities or objects, for example by creating custom fields for standard objects, including custom index fields. Commonly assigned U.S. U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 12A:
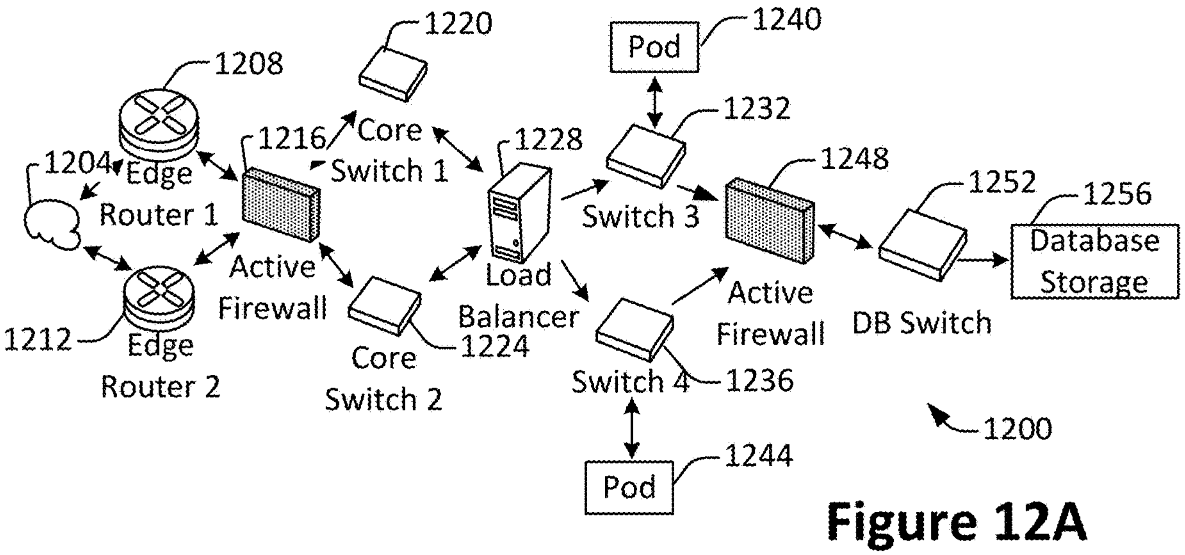
FIG. 12A shows a system diagram of an example of architectural components of an on-demand database service environment, configured in accordance with some implementations.

FIG. 12A shows a system diagram of an example of architectural components of an on-demand database service environment 1200, configured in accordance with some implementations. A client machine located in the cloud 1204 may communicate with the on-demand database service environment via one or more edge routers 1208 and 1212. A client machine may include any of the examples of user systems 1112 described above. The edge routers 1208 and 1212 may communicate with one or more core switches 1220 and 1224 via firewall 1216. The core switches may communicate with a load balancer 1228, which may distribute server load over different pods, such as the pods 1240 and 1244 by communication via pod switches 1232 and 1236. The pods 1240 and 1244, which may each include one or more servers and/or other computing resources, may perform data processing and other operations used to provide on-demand services. Components of the environment may communicate with a database storage 1256 via a database firewall 1248 and a database switch 1252.

Accessing an on-demand database service environment may involve communications transmitted among a variety of different components. The environment 1200 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 12A and 12B.

The cloud 1204 refers to any suitable data network or combination of data networks, which may include the Internet. Client machines located in the cloud 1204 may communicate with the on-demand database service environment 1200 to access services provided by the on-demand database service environment 1200. By way of example, client machines may access the on-demand database service environment 1200 to retrieve, store, edit, and/or process data model information.

In some implementations, the edge routers 1208 and 1212 route packets between the cloud 1204 and other components of the on-demand database service environment 1200. The edge routers 1208 and 1212 may employ the Border Gateway Protocol (BGP). The edge routers 1208 and 1212 may maintain a table of IP networks or 'prefixes', which designate network reachability among autonomous systems on the internet.

In one or more implementations, the firewall 1216 may protect the inner components of the environment 1200 from internet traffic. The firewall 1216 may block, permit, or deny access to the inner components of the on-demand database service environment 1200 based upon a set of rules and/or other criteria. The firewall 1216 may act as one or more of a packet filter, an application gateway, a stateful filter, a proxy server, or any other type of firewall.

In some implementations, the core switches 1220 and 1224 may be high-capacity switches that transfer packets within the environment 1200. The core switches 1220 and 1224 may be configured as network bridges that quickly route data between different components within the on-demand database service environment. The use of two or more core switches 1220 and 1224 may provide redundancy and/or reduced latency.

In some implementations, communication between the pods 1240 and 1244 may be conducted via the pod switches 1232 and 1236. The pod switches 1232 and 1236 may facilitate communication between the pods 1240 and 1244 and client machines, for example via core switches 1220 and 1224. Also or alternatively, the pod switches 1232 and 1236 may facilitate communication between the pods 1240 and 1244 and the database storage 1256. The load balancer 1228 may distribute workload between the pods, which may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248, which may act as a computer application firewall operating at the database application layer of a protocol stack. The database firewall 1248 may protect the database storage 1256 from application attacks such as structure query language (SQL) injection, database rootkits, and unauthorized information disclosure. The database firewall 1248 may include a host using one or more forms of reverse proxy services to proxy traffic before passing it to a gateway router and/or may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, the database storage 1256 may be an on-demand database system shared by many different organizations. The on-demand database service may employ a single-tenant approach, a multi-tenant approach, a virtualized approach, or any other type of database approach. Communication with the database storage 1256 may be conducted via the database switch 1252. The database storage 1256 may include various software components for handling database queries. Accordingly, the database switch 1252 may direct database queries transmitted by other components of the environment (e.g., the pods 1240 and 1244) to the correct components within the database storage 1256.

Figure 12B:
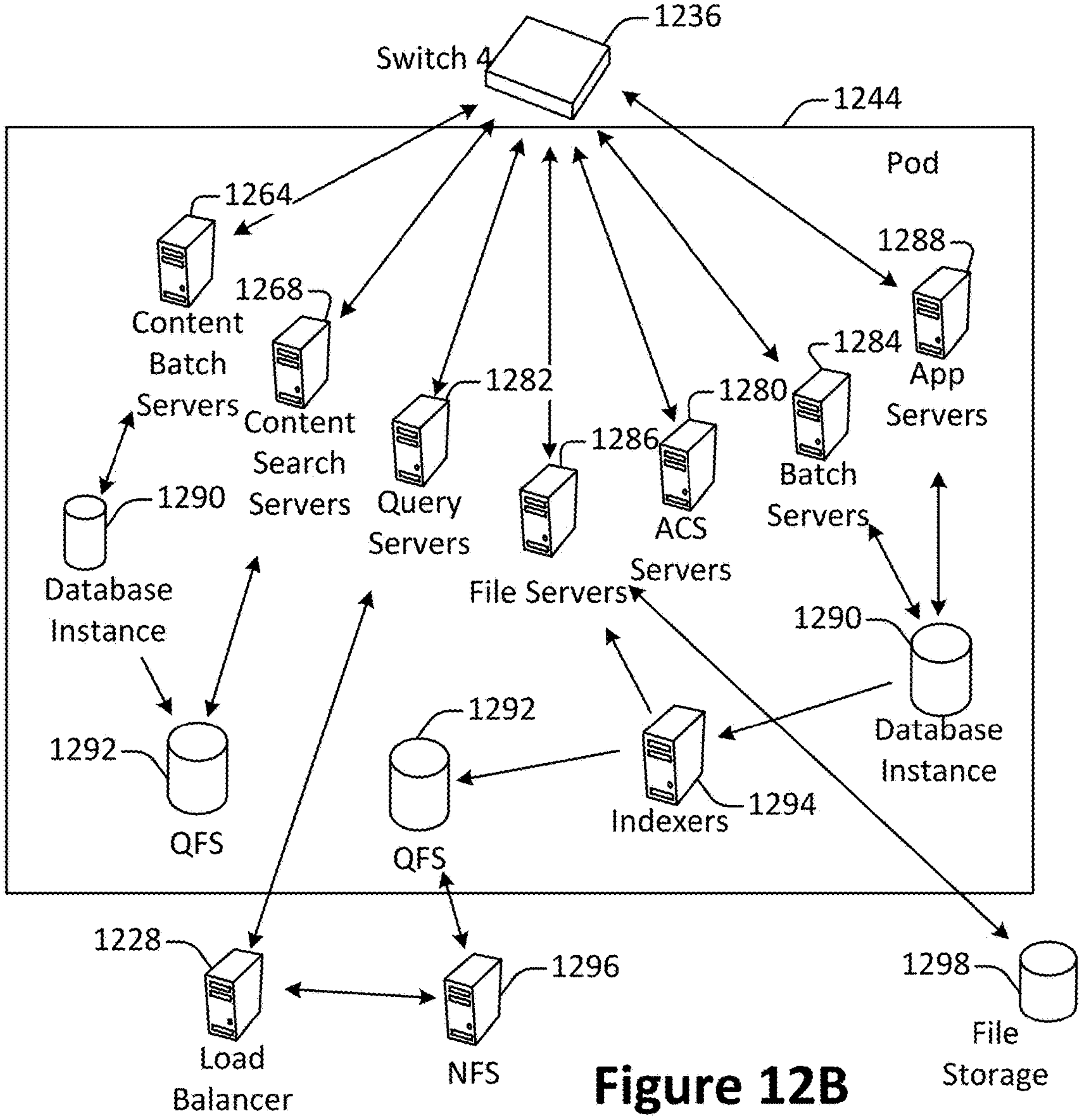
FIG. 12B shows a system diagram further illustrating an example of architectural components of an on-demand database service environment, in accordance with some implementations.

FIG. 12B shows a system diagram further illustrating an example of architectural components of an on-demand database service environment, in accordance with some implementations. The pod 1244 may be used to render services to user(s) of the on-demand database service environment 1200. The pod 1244 may include one or more content batch servers 1264, content search servers 1268, query servers 1282, file servers 1286, access control system (ACS) servers 1280, batch servers 1284, and app servers 1288. Also, the pod 1244 may include database instances 1290, quick file systems (QFS) 1292, and indexers 1294. Some or all communication between the servers in the pod 1244 may be transmitted via the switch 1236.

In some implementations, the app servers 1288 may include a framework dedicated to the execution of procedures (e.g., programs, routines, scripts) for supporting the construction of applications provided by the on-demand database service environment 1200 via the pod 1244. One or more instances of the app server 1288 may be configured to execute all or a portion of the operations of the services described herein.

In some implementations, as discussed above, the pod 1244 may include one or more database instances 1290. A database instance 1290 may be configured as an MTS in which different organizations share access to the same database, using the techniques described above. Database information may be transmitted to the indexer 1294, which may provide an index of information available in the database 1290 to file servers 1286. The QFS 1292 or other suitable filesystem may serve as a rapid-access file system for storing and accessing information available within the pod 1244. The QFS 1292 may support volume management capabilities, allowing many disks to be grouped together into a file system. The QFS 1292 may communicate with the database instances 1290, content search servers 1268 and/or indexers 1294 to identify, retrieve, move, and/or update data stored in the network file systems (NFS) 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information over a network in a manner similar to how local storage is accessed. Queries from the query servers 1222 may be transmitted to the NFS 1296 via the load balancer 1228, which may distribute resource requests over various resources available in the on-demand database service environment 1200. The NFS 1296 may also communicate with the QFS 1292 to update the information stored on the NFS 1296 and/or to provide information to the QFS 1292 for use by servers located within the pod 1244.

In some implementations, the content batch servers 1264 may handle requests internal to the pod 1244. These requests may be long-running and/or not tied to a particular customer, such as requests related to log mining, cleanup work, and maintenance tasks. The content search servers 1268 may provide query and indexer functions such as functions allowing users to search through content stored in the on-demand database service environment 1200. The file servers 1286 may manage requests for information stored in the file storage 1298, which may store information such as documents, images, basic large objects (BLOBs), etc. The query servers 1282 may be used to retrieve information from one or more file systems. For example, the query system 1282 may receive requests for information from the app servers 1288 and then transmit information queries to the NFS 1296 located outside the pod 1244. The ACS servers 1280 may control access to data, hardware resources, or software resources called upon to render services provided by the pod 1244. The batch servers 1284 may process batch jobs, which are used to run tasks at specified times. Thus, the batch servers 1284 may transmit instructions to other servers, such as the app servers 1288, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 13:
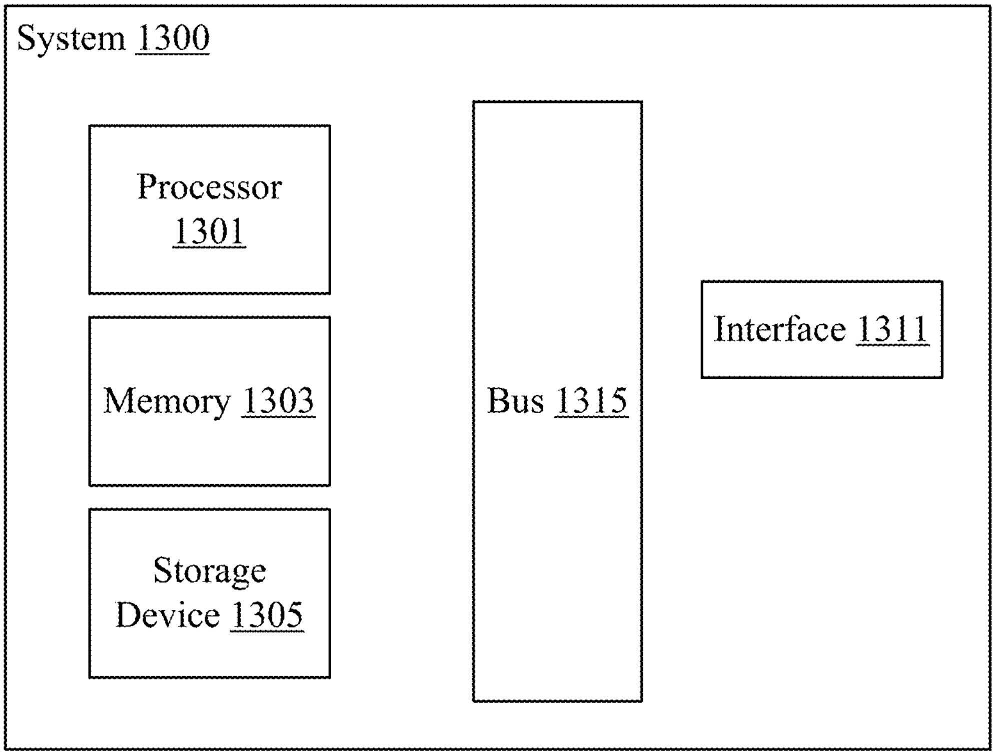
FIG. 13 illustrates one example of a computing device.

FIG. 13 illustrates one example of a computing device. According to various embodiments, a system 1300 suitable for implementing embodiments described herein includes a processor 1301, a memory module 1303, a storage device 1305, an interface 1311, and a bus 1315 (e.g., a PCI bus or other interconnection fabric.) System 1300 may operate as variety of devices such as an application server, a database server, or any other device or service described herein. Although a particular configuration is described, a variety of alternative configurations are possible. The processor 1301 may perform operations such as those described herein. Instructions for performing such operations may be embodied in the memory 1303, on one or more non-transitory computer readable media, or on some other storage device. Various specially configured devices can also be used in place of or in addition to the processor 1301. The interface 1311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:

receiving a schema registry in a file, wherein the schema registry aggregates a plurality of schema files for a data model that is associated with a database system used by a set of servers and a set of consumer devices, and wherein the plurality of schema files is in a first software language that describes objects in the data model, and the schema registry is in a second software language used by the set of consumer devices;

executing a first function in the schema registry for an object to retrieve an original schema for the object in the plurality of schema files to create first software code for the object with the original schema for an application that uses the data model; and executing a second function in the schema registry for the object to generate a new object from the original schema for the object to create second software code for a new object with the original schema for the application.

2. The method of claim 1, further comprising:

receiving a validation file that includes validation information that is used to validate the first software code and the second software code generated at a consumer device in the set of consumer devices using the schema registry.

3. The method of claim 2, further comprising:

validating the first software code and the second software code using the validation information for the object.

4. The method of claim 3, wherein validating the software code comprises:

checking types of the first software code and the second software code against types listed in the validation information for the object to determine any errors; and outputting any errors of the software code.

5. The method of claim 4, wherein the checking is performed at compile time of the application.

6. The method of claim 1, wherein receiving the schema registry comprises:

communicating with a server in the set of servers through an interface to retrieve the schema registry.

7. The method of claim 1, wherein receiving the schema registry comprises:

loading the schema registry into a runtime environment at a consumer device in the set of consumer devices, wherein the runtime environment is associated with the second software language.

8. The method of claim 1, wherein the schema registry is stored in a single file.

9. The method of claim 1, wherein the schema registry is generated by:

aggregating the plurality of schema files into a single file; and processing objects in the single file to generate the first function and the second function for objects in the schema registry.

10. The method of claim 9, wherein the schema registry is generated by:

adding variables in the schema registry to include the first function and the second function for the objects.

11. The method of claim 9, wherein processing objects to generate the first function and the second function for objects comprises:

determining an array; and looping through the array and invoking a register schema function on each object of the array to generate objects in the schema registry.

12. The method of claim 9, wherein processing objects to generate the first function and the second function for objects comprises:

determining an object; and looping through the object and invoking a register schema function on any objects found in the object to generate objects in the schema registry.

13. A non-transitory computer-readable storage medium having stored thereon computer executable instructions, which when executed by a computing device, cause the computing device to be operable for:

receiving a schema registry in a file, wherein the schema registry aggregates a plurality of schema files for a data model that is associated with a database system used by a set of servers and a set of consumer devices, and wherein the plurality of schema files is in a first software language that describes objects in the data model, and the schema registry is in a second software language used by the set of consumer devices;

executing a first function in the schema registry for an object to retrieve an original schema for the object in the plurality of schema files to create first software code for the object with the original schema for an application that uses the data model; and executing a second function in the schema registry for the object to generate a new object from the original schema for the object to create second software code for a new object with the original schema for the application.

* * * * *